(12) United States Patent
Heidenreich et al.

(10) Patent No.: US 9,703,746 B2
(45) Date of Patent: Jul. 11, 2017

(54) HEADEND WITH REDUNDANCY, AND AN ASSOCIATED METHOD

(75) Inventors: René Heidenreich, Berlin (DE); Torsten Görig, Schoeneiche bei Berlin (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 594 days.

(21) Appl. No.: 14/240,786

(22) PCT Filed: Aug. 8, 2012

(86) PCT No.: PCT/EP2012/065501
§ 371 (c)(1),
(2), (4) Date: Feb. 25, 2014

(87) PCT Pub. No.: WO2013/045160
PCT Pub. Date: Apr. 4, 2013

(65) Prior Publication Data
US 2014/0207985 A1 Jul. 24, 2014

(30) Foreign Application Priority Data
Sep. 30, 2011 (DE) .......... 10 2011 083 816

(51) Int. Cl.
*G06F 13/42* (2006.01)
*H04H 60/11* (2008.01)
*H04L 12/24* (2006.01)
*H04H 20/67* (2008.01)

(52) U.S. Cl.
CPC ............. *G06F 13/42* (2013.01); *H04H 60/11* (2013.01); *H04H 20/67* (2013.01); *H04L 41/0654* (2013.01)

(58) Field of Classification Search
CPC ................... G06F 13/42; H04L 41/0654
See application file for complete search history.

(56) References Cited

U.S. PATENT DOCUMENTS

| 2004/0011579 | A1 | 1/2004 | Heckmann et al. |
| 2006/0088023 | A1 | 4/2006 | Muller |
| 2010/0275065 | A1 | 10/2010 | Cornelius et al. |
| 2011/0217025 | A1* | 9/2011 | Begen ............ H04N 5/931 386/338 |

FOREIGN PATENT DOCUMENTS

| DE | 100 11 267 A1 | 9/2001 |
| EP | 2 282 451 A1 | 2/2011 |

OTHER PUBLICATIONS

International Search Report issued in corresponding application No. PCT/EP2012/065501 mailed Dec. 21, 2012.

\* cited by examiner

*Primary Examiner* — Farley Abad
(74) *Attorney, Agent, or Firm* — Carter, DeLuca, Farrell & Schmidt, LLP (57) ABSTRACT

A head station including at least two identical processing units supplied respectively with at least one identical input datastream in order to generate an output datastream, and an output bus system connected to the processing units for the exchange of output datastreams and status data generated in each of the processing units is provided. Additionally, within the head station, several decision circuits connected to the output bus system are provided for the selection of the output datastream to be transmitted in each processing unit in each case to a transmitter system.

18 Claims, 5 Drawing Sheets

HEADEND WITH REDUNDANCY, AND AN ASSOCIATED METHOD

The invention relates to a head station (English: head station) with redundancy and an associated operating method.

Redundantly configured communications systems typically comprise two communications systems which each generate an output datastream simultaneously and independently of one another. Redundant communications modules in which the decision regarding which output datastream is to be routed further is made on the basis of status data exchanged between the two communications modules are known from DE 100 11 267 A1.

Figure 1:
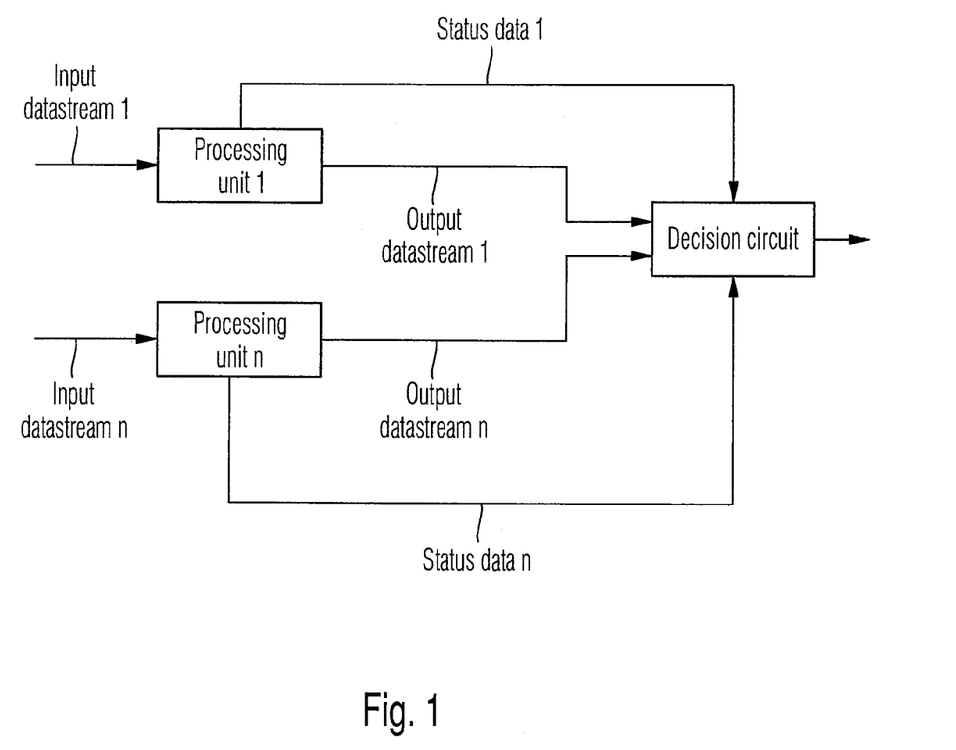
FIG. 1 a block-circuit diagram of a redundant communications system.

In an arrangement of a redundantly configured communications system illustrated schematically in FIG. 1, on the basis of which the problem is explained, but which, according to the applicant's understanding, is not the prior art, the output-datastreams generated respectively by the two communications systems are transmitted to a decision circuit. On the basis of the two output datastreams and on the basis of the status data generated respectively in the two communications systems and supplied to the decision circuit, the decision circuit decides which of the two output datastreams are transmitted to the transmission pathway.

In this arrangement of a redundantly configured communications system, if the decision circuit fails, it is disadvantageous that no output datastream is transmitted via the transmission pathway. Accordingly, the decision circuit becomes the critical component in the redundantly configured communications system (a so-called single-point-of-failure; German: Ein-Punkt-Fehler). As an additional disadvantage, if the two output datastreams are not synchronised with one another, a phase-coherent switchover between the two output datastreams cannot be implemented in the decision circuit for the further routing of a gap-free output datastream to the transmission pathway.

The object of the invention is therefore to develop further a redundantly configured head station in a communications system, especially in a radio transmission system, especially with common-frequency operation, in such a manner that the above-named disadvantages no longer occur.

The object is achieved by the head station according to the invention with the features of claim 1 and by the associated method according to the invention with the features of claim 16. Advantageous technical developments are specified in the respectively dependent claims.

In a head station according to the invention with redundancy, several identical processing units which are each supplied from at least one identical input datastream are provided. In each processing unit, an output datastream is generated respectively from the at least one input datastream by implementing several processing steps—for example, coding, multiplexing, data formatting and so on. The outputs of each processing unit are connected to one another via an output bus system. Via the output bus system, the output datastreams and status data generated by the individual processing units are exchanged between the individual processing units. The status data contain, for example, information about the functionality of the respective processing unit and the transmission pathway between each processing unit and the transmitter system.

Additionally, the head station according to the invention provides at least one decision circuit, which, starting from the output datastreams and status data exchanged between the individual processing units, selects for each processing unit respectively the output datastream which is transmitted on the associated transmission pathway between each processing unit and the transmitter system.

In this manner, the transmission of the output datastream, which is selected respectively from all of the output datastreams generated by one processing unit, no longer takes place from the decision circuit to the transmitter system. Instead, either the output datastream generated by the respective processing unit or the output datastream generated by another processing unit and transmitted via the output bus system to the respective processing unit is transmitted from each processing unit to the transmitter system via the allocated transmission pathway without intermediate connection of a decision circuit. The transmitter system selects, from all simultaneously received output datastreams, the correct output datastream for transmission via the transmission pathway to the transmitter system.

The selection of the output datastream to be transmitted from each processing unit on the associated transmission pathway is made on the basis of the availability of the individual output datastreams in each processing unit; on the basis of the conformity of the individual output datastreams with the requirements of the transmission standard used; and on the basis of the status data of the respective processing unit, which signal the functionality of the respective processing unit and the functionality of the transmission pathway between each processing unit and the transmission system.

In order to guarantee for every processing unit a correct selection of an output datastream to be transmitted via the transmission pathway, the decision circuits in the head station according to the invention are embodied in a redundant manner by providing at least two decision circuits. The identification and selection of the correctly functioning decision circuit in each case—for example, through a superordinate monitoring element in the case of two decision circuits or by determining the decision circuit generating an identical result in the case of at least three decision circuits—is possible on the basis of different, known methods and will not be explained in detail at this point.

The preferably redundantly configured decision circuits in a first embodiment of the invention are each connected outside the individual processing units to the output bus system and, on the basis of the output datastreams and status data transmitted from each processing unit on the output bus system, make a selection for each processing unit respectively regarding which output datastream the respective processing unit should transmit to the associated transmission pathway in each case.

The preferably redundantly configured decision circuits in a second embodiment of the invention are each integrated in a single processing unit acting as a master processing unit and, make a selection respectively for the processing unit acting as the master processing unit and for all of the other processing units acting as slave processing units, in each case with regard to which output datastream each processing unit should transmit respectively on the associated transmission pathway.

The preferably redundantly configured decision circuits in a third embodiment of the invention are integrated in each individual processing unit respectively and make a selection for each processing unit with regard to which output datastream each processing unit should transmit respectively on the associated transmission pathway.

In order to allow a meaningful selection of the output datastream to be transmitted by the transmitter system on the transmission pathway from the transmitter system to the receiver system, the output datastreams selected respectively by the individual processing units are preferably transmitted synchronously on the associated transmission pathway between the respective processing unit and the transmitter system via a synchronisation unit.

In order to guarantee a gap-free and accordingly phase-coherent switching between the on the individual transmission pathways between each processing unit and the output datastreams transmitted respectively within the transmitter system, the switchover is preferably implemented in each processing unit between two output datastreams to be transmitted on the associated transmission path, in each case only at the times of the transition between respectively successive data frames of the synchronously transmitted output datastreams.

Since a given processing time is necessary in each case for the selection of the output datastream to be transmitted from each processing unit on the transmission pathway to the transmitter system, the switch-over between two output datastreams is preferably implemented in each processing unit at the respectively next transition time between two successive data frames respectively, that is, delayed by the time duration for the transmission of one data frame.

The supply of the individual processing units with identical datastreams generated respectively by a data source, —for example a studio—which correspond, for example, to the audio and video data of individual broadcast programmes, is implemented via an input bus system.

In order to synchronise the input datastreams transmitted in series on the input bus system within the individual processing units, synchronisation data are preferably transmitted between the data source and the individual processing units via the input bus system. The synchronisation data can be, on the one hand, time-stamp data in the individual data packets of the individual input datastreams or data for marking the sequence of the individual data packets in the individual input datastreams or, on the other hand, specified data-bit sequences transmitted at specified positions in specified data packets of the individual input datastreams respectively.

In order additionally to increase the redundancy of the head station according to the invention, the input bus system and/or the output bus system is preferably configured in a redundant manner. The decision regarding which input and/or output bus system is activated at the respective time, is arbitrary.

In order to transmit the output datastream generated respectively by each processing unit in a data format of the transmission standard used on the transmission pathway between the transmitter system and the receiver system, data conversion is preferably provided at the output end. In this context, one conversion component can be used for every transmission standard used or a conversion component covering all of the transmission standards can be used. In order to increase the redundancy of the head station according to the invention, the data conversion can also be embodied in a redundant manner. A data conversion can also be provided at the input end, in the region of the input bus system.

The head station according to the invention and the associated method according to the invention are described in detail below with reference to the drawings. The drawings are as follows.

Individual embodiments of the head station according to the invention are explained in detail below with reference to the block-circuit diagrams in FIGS. 2A, 2B and 2C, and the associated method according to the invention is explained with reference to the flow chart in FIG. 3.

In the first method step S10, which is implemented optionally, the datastreams generated in the data source—generally in the studio—are converted into video and/or audio datastreams associated respectively with programmes or services—if required, into another data format. This can relate, for example, to an input data conversion from a data format typically used in studio technology—for example, Serial Digital Interface (SDI) data format or Internet Protocol (IP) data format—into a proprietary data format used in the head station and/or a matching of the datastream to be transmitted to a modified transmission medium.

Figure 2A:
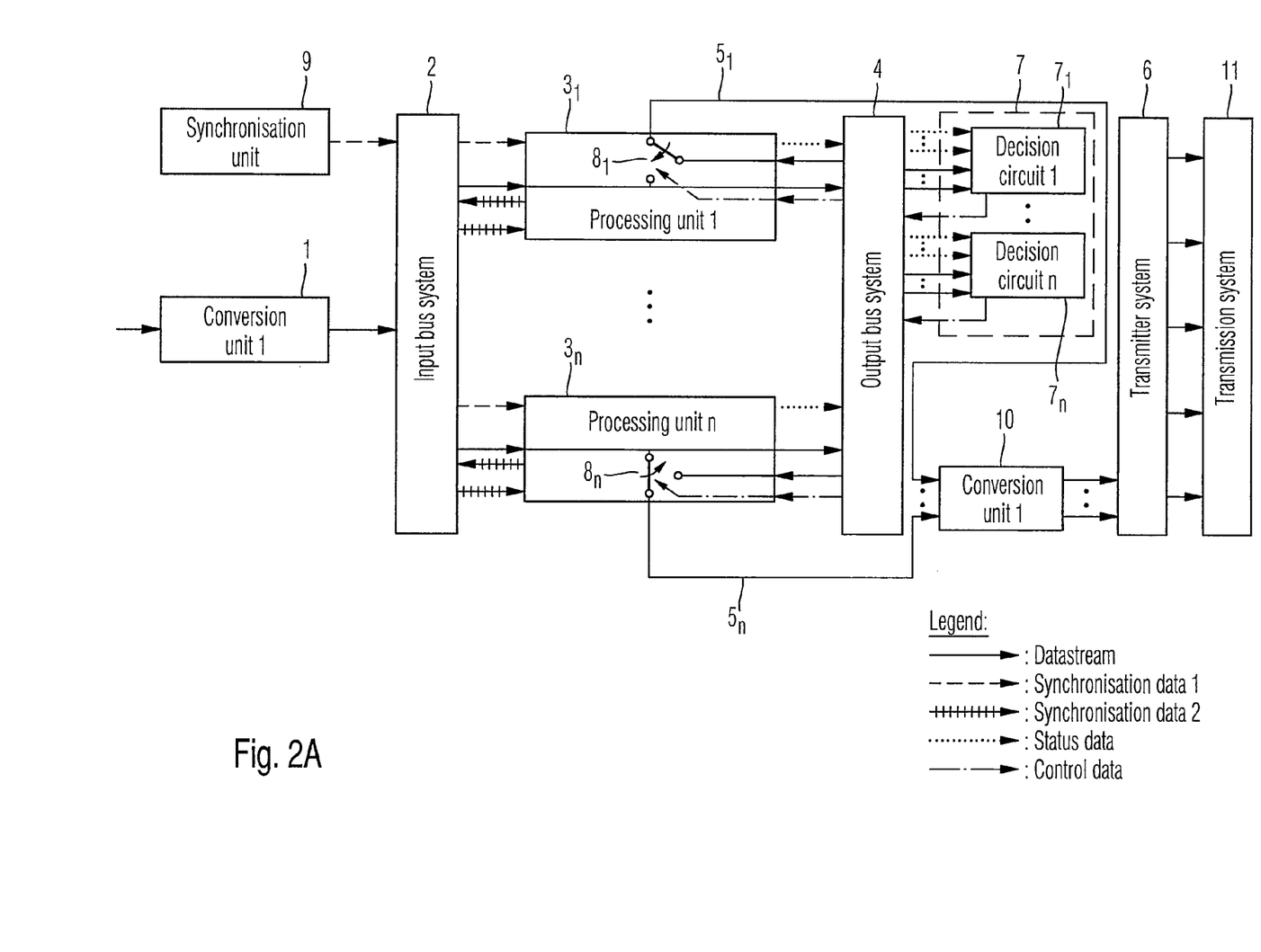
FIG. 2A a block-circuit diagram of a first embodiment of a head station according to the invention.
Figure 2B:
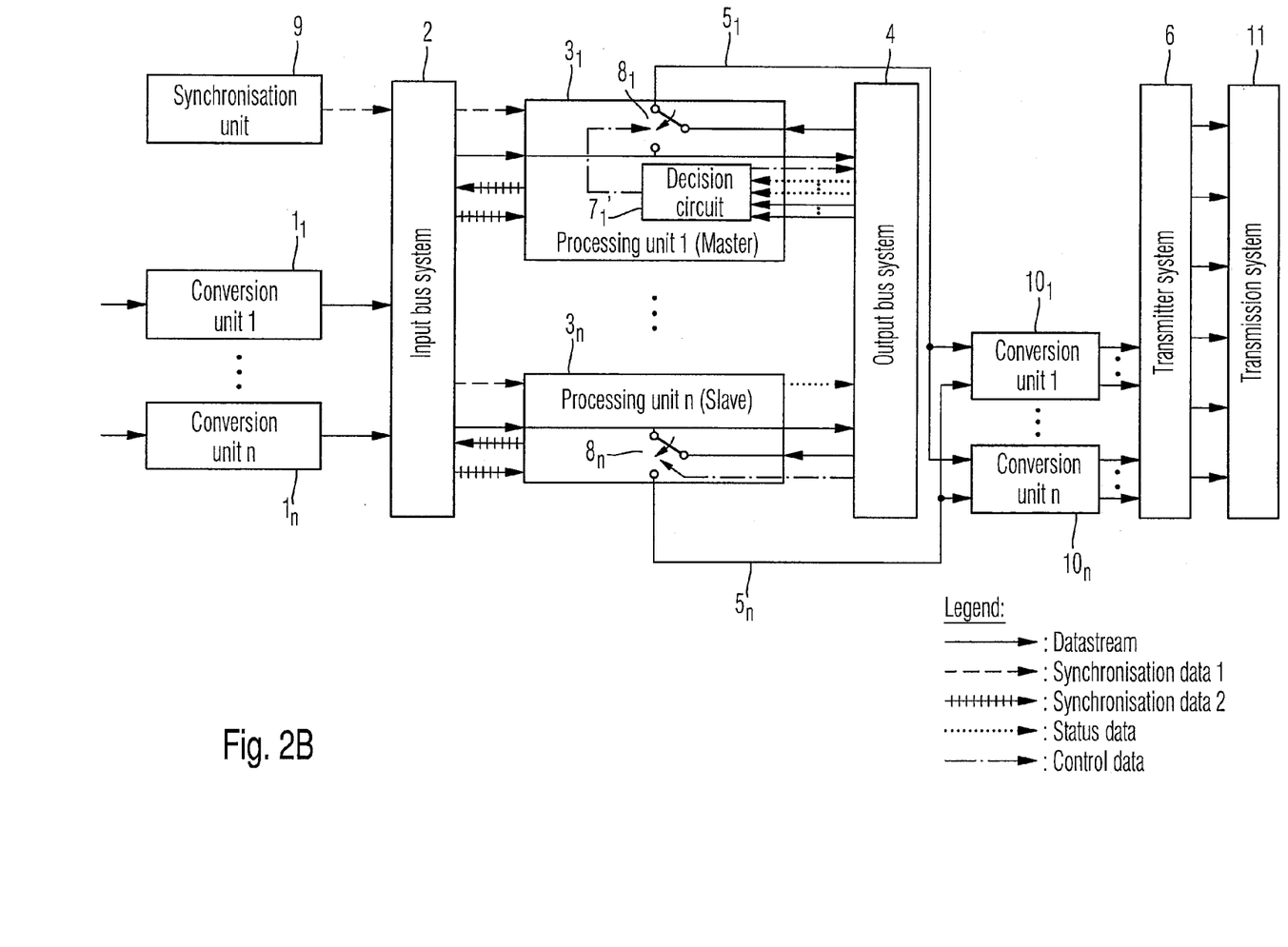
FIG. 2B a block-circuit diagram of a second embodiment of a head station according to the invention.

The input data conversion can be realised, as illustrated in FIG. 2A, by a single conversion component 1, which implements a data conversion from all data formats used in studios into the data format used in the head station, or, as illustrated in FIG. 2B, by several individual conversion components $1_1$, $1_2$, ..., $1_n$, which each implement a data conversion only from a single data format used in the sound studio into the data format used in the head station. Finally, the data conversion can be realised, as illustrated in FIG. 2C, by a redundant conversion system 1' comprising several redundantly configured conversion components $1_1'$, $1_2'$, ..., $1_n'$. In this context, the individual conversion component $1_1'$, $1_2'$, ..., $1_n'$ implements an identical data conversion in each case. Via a decision circuit not illustrated in FIG. 2C, it is determined which conversion component $1_1'$, $1_2'$, ..., $1_n'$ is operating correctly and which conversion result will accordingly be routed to the output of the redundant conversion system 1'.

In the next method step S20, the input datastreams generated by the data source are supplied via an input bus system 2 to the individual, identically embodied processing units $3_1$, $3_2$, ..., $3_n$. The input bus system 2 can be configured redundantly in order to increase the reliability of the head station according to the invention. The switching between the individual, redundantly configured input bus systems 2 is preferably implemented by a decision circuit not illustrated in FIGS. 2A, 2B and 2C.

Since the individual input datastreams are transmitted in series via the input bus system 2 and are accordingly no longer synchronised with one another, they must be synchronised with regard to a synchronous processing in the individual parallel processing units $3_1$, $3_2$, ..., $3_n$. For this purpose, synchronisation data—referenced as synchronisation data 2 in FIGS. 2A, 2B and 2C—are used in the individual data packets of the individual input datastreams transmitted in series between the data source and the individual processing units $3_1$, $3_2$, ..., $3_n$. Time-stamp data, stored, for example, at different data-bit positions in the header (German Kopf) of the individual data packets, or the data for marking the sequence of the respective data packets in the respective input datastream, also stored at given data bit positions in the header of the individual data packets, can be used for this purpose. Given data-bit sequences at given data bit positions in given data packets of the individual input datastreams, which are specified in the individual transmission standards and therefore provide a specified relative time interval from one another, can also be identified and used for the synchronisation of the individual input datastreams.

Using these synchronisation data, the individual data packets of the individual input datastreams are packed in the individual processing units $3_1, 3_2, \ldots, 3_n$ in the correct time sequence in the output datastream to be generated and transmitted synchronised with one another in time in the individual output datastreams generated respectively by the individual processing units $3_1, 3_2, \ldots, 3_n$.

In the next method step S30, in the identically embodied processing units $3_1, 3_2, \ldots, 3_n$, output datastreams are generated respectively from the individual input datastreams supplied. Since several input datastreams are typically supplied to the individual processing units $3_1, 3_2, \ldots, 3_n$, the multiplexing of the output datastream from the individual input datastreams is realised in the processing units $3_1, 3_2, \ldots, 3_n$ as a quite essential processing step. Alongside this, a coding and a data formatting of the output datastream generated is also preferably provided in the individual processing units $3_1, 3_2, \ldots, 3_n$. Additional, conventional processing steps can be implemented alongside this in a pre-processing processor, which will not be explained in greater detail at this point.

In the next method step S40, the output datastreams generated in the individual processing units $3_1, 3_2, \ldots, 3_n$ are exchanged via the output bus system 4 between the individual processing units $3_1, 3_2, \ldots, 3_n$. Additionally, an exchange of status data generated in the individual processing units $3_1, 3_2, \ldots, 3_n$ is also performed via the output bus system 4. These status data each signal a correct functioning of the respective processing unit $3_1, 3_2, \ldots, 3_n$ and a correct functioning of the respective transmission pathway $5_1, 5_2, \ldots, 5_n$ between the respective processing unit $3_1, 3_2, \ldots, 3_n$ and the transmitter system 6. By analogy with the input bus system 2, the output bus system 4 can also be configured redundantly to increase the reliability of the head station according to the invention. The switching between the individual redundantly configured output bus systems 4 is implemented by a decision circuit not illustrated in FIGS. 2A, 2B and 2C.

During correct operation, all of the processing units $3_1, 3_2, \ldots, 3_n$ each produce an identical—bit-identical—datastream, and the transmission pathway from each processing unit $3_1, 3_2, \ldots, 3_n$ to the transmitter system 6 operates in an error-free manner. In the event of an error, at least one processing unit $3_1, 3_2, \ldots, 3_n$ respectively will generate an erroneous datastream and/or at least one transmission pathway from a processing unit $3_1, 3_2, \ldots, 3_n$ to the transmitter system 6 will fail. On the basis of the output datastreams and status data generated respectively in the individual processing units $3_1, 3_2, \ldots, 3_n$, the output datastream to be transmitted from the respective processing unit $3_1, 3_2, \ldots, 3_n$ on the associated transmission pathway $5_1, 5_2, \ldots, 5_n$ between the respective processing unit $3_1, 3_2, \ldots, 3_n$ and the transmitter system 6 is accordingly selected in the subsequent method step S50 in a decision-circuit system or respectively several redundant decision-circuit systems.

In a first embodiment according to the invention, the selection of the output datastream to be transmitted from each of the individual processing units $3_1, 3_2, \ldots, 3_n$ is implemented in a decision circuit from the output datastreams generated by all of the processing units $3_1, 3_2, \ldots, 3_n$. This can be a single decision circuit or preferably, according to FIG. 2A, a redundant decision-unit system 7 comprising several decision circuits $7_1, 7_2, \ldots, 7_n$ configured redundantly. Each individual decision circuit $7_1, 7_2, \ldots, 7_n$ is connected to the output bus system 4 and therefore has access to the output datastreams and status data generated respectively in all the processing units $3_1, 3_2, \ldots, 3_n$.

Via the output datastreams available respectively on the output bus system 4, the individual decision circuit $7_1, 7_2, \ldots, 7_n$ accesses information relevant to its decision regarding which processing unit $3_1, 3_2, \ldots, 3_n$ has not generated an output datastream at all and therefore does not achieve a correct functioning. The comparison of the individual output datastreams with the specifications of the transmission standard used in the common-frequency network—for example, ATSC-M/H, DVB-T or DVB-T2—supplies the individual decision circuit $7_1, 7_2, \ldots, 7_n$ with further information relevant for the decision regarding which processing unit $3_1, 3_2, \ldots, 3_n$ is functioning correctly or respectively operating incorrectly. From the status data generated respectively in the individual processing units $3_1, 3_2, \ldots, 3_n$ and supplied respectively via the output bus system 4 to the individual decision circuits $7_1, 7_2, \ldots, 7_n$, each decision circuit $7_1, 7_2, \ldots, 7_n$ obtains further information relevant for the decision regarding which processing unit $3_1, 3_2, \ldots, 3_n$ and which allocated transmission pathway $5_1, 5_2, \ldots, 5_n$ between the respective processing unit $3_1, 3_2, \ldots, 3_n$ and the transmitter system 6 is operating correctly or in a faulty manner in each case.

In the case of a redundant decision-circuit system 7 with several redundantly configured decision circuits $7_1, 7_2, \ldots, 7_n$, each individual decision circuit $7_1, 7_2, \ldots, 7_n$ generates control data for the individual processing units $3_1, 3_2, \ldots, 3_n$ from the output datastreams and status data supplied in the manner already mentioned. Via an additional decision circuit, which is not illustrated in the individual FIGS. 2A, 2B and 2C, the correctly operating decision circuits $7_1, 7_2, \ldots, 7_n$ are identified, and the control data they have generated are routed to the individual processing units $3_1, 3_2, \ldots, 3_n$.

In the case of a correct operation of the respective processing unit $3_1, 3_2, \ldots, 3_n$ and the respective transmission pathway $5_1, 5_2, \ldots, 5_n$ between the respective processing unit $3_1, 3_2, \ldots, 3_n$ and the transmitter system 6, the respective processing unit $3_1, 3_2, \ldots, 3_n$ is activated by means of the control data for transmission of an output datastream on the allocated transmission pathway $5_1, 5_2, \ldots, 5_n$ between the respective processing unit $3_1, 3_2, \ldots, 3_n$ and the transmitter system 6. In the case of a correctly generated output datastream generated correctly by the respective processing unit $3_1, 3_2, \ldots, 3_n$, the activated processing unit $3_1, 3_2, \ldots, 3_n$ is caused, via the allocated control data, to transmit the respective datastream to the transmitter system 6 on the allocated transmission pathway $5_1, 5_2, \ldots, 5_n$, and, in the event of an output datastream generated incorrectly by the respective processing unit $3_1, 3_2, \ldots, 3_n$, to transmit the output datastream generated correctly by another processing unit $3_1, 3_2, \ldots, 3_n$. In the latter case, in the presence of several output datastreams generated correctly in each case by one processing unit $3_1, 3_2, \ldots, 3_n$, the output datastream generated respectively by a previously determined processing unit $3_1, 3_2, \ldots, 3_n$ can be prioritised for selection in the respective processing unit $3_1, 3_2, \ldots, 3_n$.

In a second embodiment according to the invention, the selection of the output datastream to be transmitted from the individual processing units $3_1, 3_2, \ldots, 3_n$ in each case from the output datastreams generated by all of the processing units $3_1, 3_2, \ldots, 3_n$ respectively is realised by a decision circuit integrated, as shown in FIG. 2B, within a single processing unit $3_1$ acting as a master processing unit, which comprises either a single decision circuit or a redundant decision-circuit system with several redundantly configured decision circuits.

The control data required respectively for all of the processing units $3_1, 3_2, \ldots, 3_n$ are generated in each case from the output datastreams and status data supplied respectively from the other processing units $3_1, 3_2, \ldots, 3_n$ via the output bus system 4 of the master processing unit $3_1$ and the output datastream and status data generated in the master processing unit $3_1$. What was stated with regard to the first embodiment according to the invention for the redundant decision-circuit system comprising several redundantly configured decision circuits $7_1, 7_2, \ldots, 7_n$ also applies in the case of a decision-circuit system comprising several redundantly configured decision circuits within a master processing unit $3_1$.

Figure 2C:
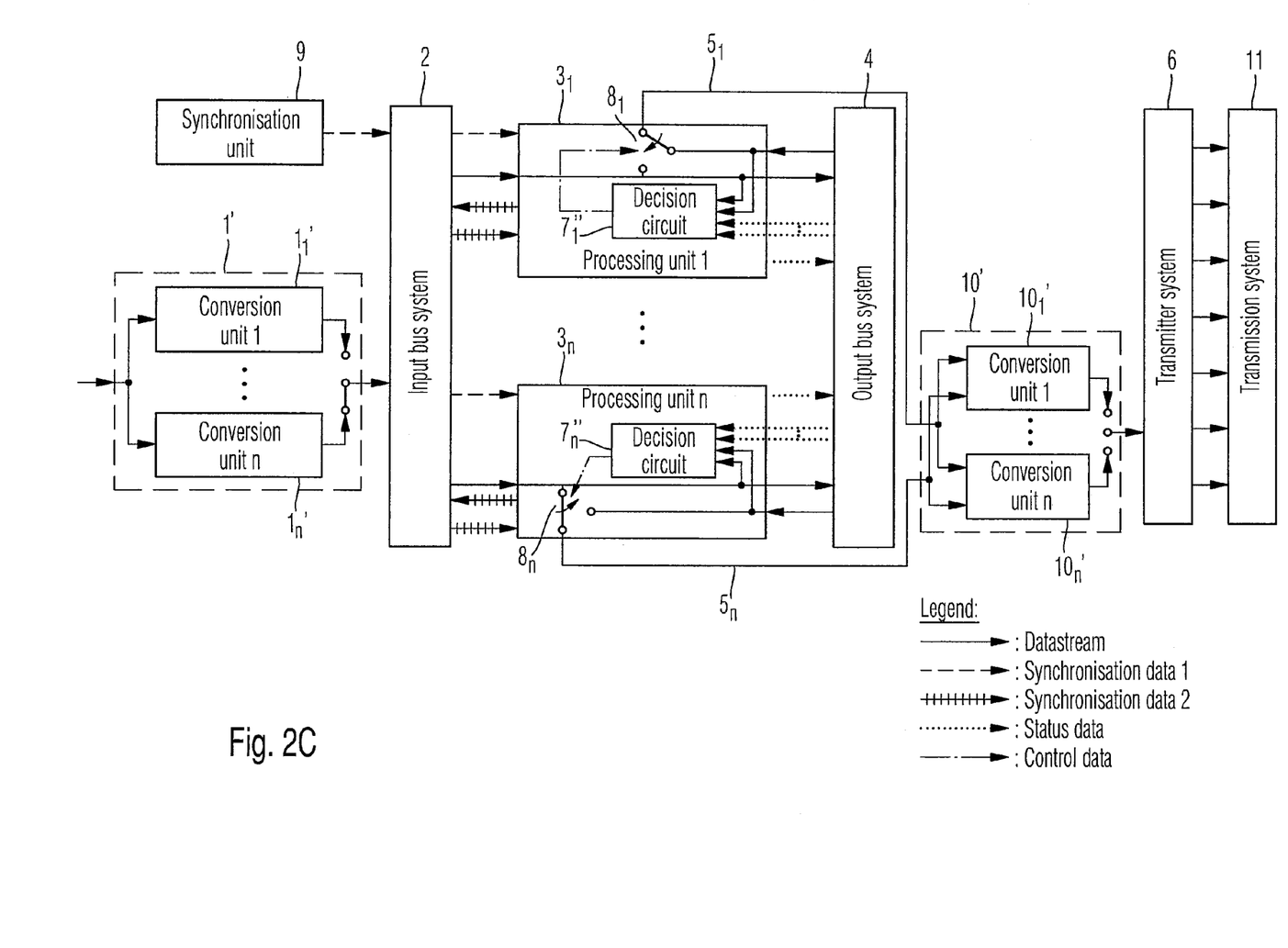
FIG. 2C a block-circuit diagram of a third embodiment of a head station according to the invention.
Figure 3:
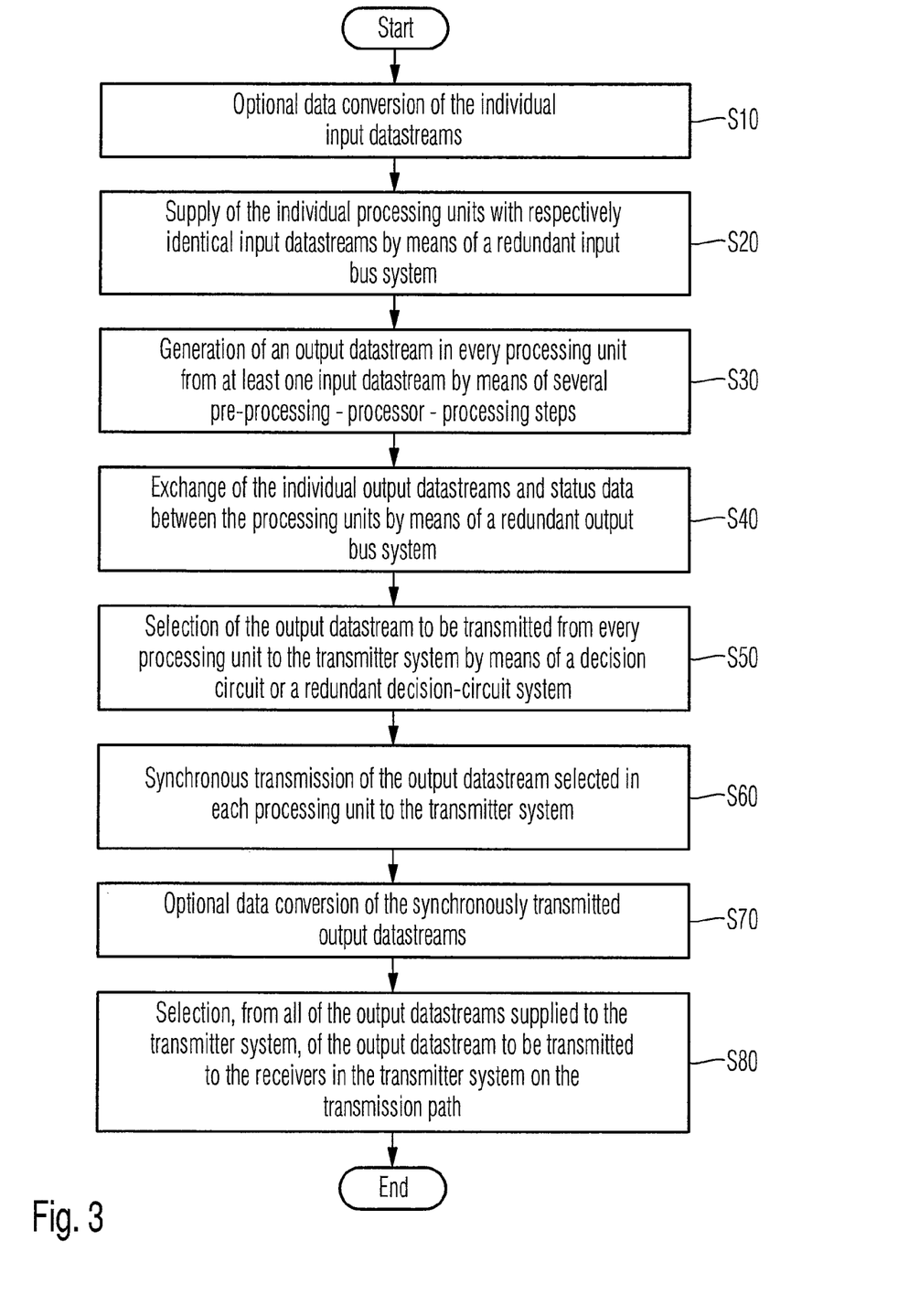
FIG. 3 a flow chart of an associated method according to the invention.

In a third embodiment according to the invention, as shown in FIG. 2C, one decision circuit, which exists either as a single decision circuit or as a redundant decision-circuit system with several redundantly configured decision circuits is integrated in each processing unit $3_1, 3_2, \ldots, 3_n$ respectively. This decision circuit determines the control data for the associated processing unit $3_1, 3_2, \ldots, 3_n$ from the output datastreams and status data supplied to each processing unit $3_1, 3_2, \ldots, 3_n$ respectively via the output bus system 4 from the other processing units $3_1, 3_2, \ldots, 3_n$ and the output datastream and status data generated in each case in the associated processing unit $3_1, 3_2, \ldots, 3_n$. In the case of a redundant decision-circuit system comprising several redundantly configured decision circuits within the individual processing units $3_1, 3_2, \ldots, 3_n$, what was stated about the first embodiment according to the invention applies in an equivalent manner for the redundant decision-circuit system composed of several redundantly configured decision circuits $7_1, 7_2, \ldots, 7_n$.

The selection of the output datastream to be transmitted from the each processing unit $3_1, 3_2, \ldots, 3_n$ to the transmitter system 6 from the output datastream generated and buffered in the respective processing unit $3_1, 3_2, \ldots, 3_n$ or from an output datastream generated in another processing unit $3_1, 3_2, \ldots, 3_n$ transmitted via the output bus system 4 and buffered in the respective processing unit $3_1, 3_2, \ldots, 3_n$, is implemented by controlling a switch $8_1, 8_2, \ldots, 8_n$ realised in the respective processing unit $3_1, 3_2, \ldots, 3_n$ by means of the control data supplied to each processing unit $3_1, 3_2, \ldots, 3_n$ from one of the decision circuits.

In order to switch between the output datastreams transmitted on the individual transmission pathways $5_1, 5_2, \ldots, 5_n$ respectively in a gap-free manner within the transmitter system 6, a phase-coherent transmission of the individual output datastreams on the individual transmission pathways $5_1, 5_2, \ldots, 5_n$ from each processing unit $3_1, 3_2, \ldots, 3_n$ to the transmitter system 6 is necessary. For this purpose, switch-over processes in the individual switches $8_1, 8_2, \ldots, 8_n$ are implemented in each case only at the times of a transition between two successive data frames of the individual output datastreams respectively. Since a certain processing time is required for the determination in the individual processing units $3_1, 3_2, \ldots, 3_n$ of the output datastreams to be selected respectively in the individual decision circuits, the switch-over between two output datastreams in the individual switches $8_1, 8_2, \ldots, 8_n$ is delayed in each case by the transmission time of one data frame.

In the next method step S60, the output datastreams selected in the individual processing units $3_1, 3_2, \ldots, 3_n$ respectively for transmission to the transmitter system 6 are transmitted synchronously on the associated transmission pathway $5_1, 5_2, \ldots, 5_n$ to the transmitter system 6. For the synchronisation of the individual output datastreams, each processing unit $3_1, 3_2, \ldots, 3_n$ receives synchronisation data, which are shown in FIGS. 2A, 2B and 2C as synchronisation data 2, from a synchronisation unit 9—for example, a receiver unit for the Global Position System (GPS) signal or the DCF77 signal, which are used respectively as reference time signals. The data packets provided with synchronisation data 1 in the individual output datastreams are synchronised with the synchronisation data 2 provided by the synchronisation unit 9, so that a synchronous transmission of the output datastreams selected by the individual processing units $3_1, 3_2, \ldots, 3_n$ is guaranteed.

In the subsequent optional method step S70, an output data conversion of the output datastreams selected in each of the individual processing units $3_1, 3_2, \ldots, 3_n$ and transmitted to the transmitter system 6 from a proprietary data format typically used in the head station according to the invention into a data format used on the transmission pathway between the transmitter system 6 and the receiver system of the common-frequency network is implemented. The output data conversion can be realised in a manner equivalent to the input conversion in method step S10 through a single conversion unit 10 as shown in FIG. 2A, which provides all possible data conversions. The output data conversion can also be implemented, as shown in FIG. 2B, by several conversion units $10_1, 10_2, \ldots, 10_n$, which each implement a data conversion only between two given data formats.

The output data conversion can also be implemented in a redundant manner, as shown in FIG. 2C, by realising a redundant conversion system 10' comprising several redundantly configured conversion components $10_1', 10_2', \ldots, 10_n'$. In this context, the individual conversion components $10_1', 10_2', \ldots, 10_n'$ each implement an identical data conversion. Via a decision circuit not illustrated in FIG. 2C, it is determined which conversion component $10_1', 10_2', \ldots, 10_n'$ is operating correctly and which conversion result will therefore be routed to the output of the redundant conversion system 10'.

As illustrated in FIGS. 2A to 2C, the converted datastreams are supplied directly to the transmitter system 6 or alternatively via the output bus system 4 and the respective processing units $3_1, 3_2, \ldots, 3_n$ to the transmitter system 6.

In the final method step S80, within the transmitter system 2, which typically comprises several regionally distributed transmission units, the output datastream to be transmitted on the transmission pathway 11 is selected from all of the output datastreams transmitted respectively in the individual transmission pathways $5_1, 5_2, \ldots, 5_n$ between the respective processing unit $3_1, 3_2, \ldots, 3_n$ and the transmitter system 6. On the basis of the output datastreams received on the individual transmission pathways $5_1, 5_2, \ldots, 5_n$ respectively, the transmitter system 6 recognises which transmission pathways $5_1, 5_2, \ldots, 5_n$ are faulty. If a transmission pathway $5_1, 5_2, \ldots, 5_n$, from which the transmitter system 6 has so far selected the output datastream for routing further to the transmission pathway 11 between the transmitter system 6 and the receiver, switches, after a correct operation, into a faulty operation, a switch-over is implemented to an output datastream which is transmitted on a transmission pathway $5_1, 5_2, \ldots, 5_n$ currently functioning correctly. In this context, the switch-over between the two output datastreams is implemented in a gap-free manner, because the output datastreams transmitted on all of the transmission pathways $5_1, 5_2, \ldots, 5_n$ respectively are transmitted synchronously and in a phase-coherent manner.

The invention is not restricted to the individual embodiments of the head station according to the invention and the associated method according to the invention. In particular, any combinations of the features claimed in the individual claims, the features disclosed in the description and the features illustrated in the individual drawings of the figures are also covered by the invention.

The invention claimed is:

1. A head station comprising:
    at least two identical processing units, which are each supplied with at least one identical input datastream and generate an output datastream;
    an output bus system connected to the at least two identical processing units for an exchange of output datastreams and status data generated in the at least two identical processing units respectively;
    at least one decision circuit connected to the output bus system in order to select the output datastream in each processing unit to be transmitted respectively to a transmitter system, and
    a synchronisation unit for synchronous transmission of the output datastream selected by each processing unit and to be transmitted to the transmitter system,
    wherein transmission of the output datastreams to be transmitted synchronously to the transmitter system takes place delayed by a transmission time of output data frames of the output datastreams, and
    wherein the selection of the output datastream to be transmitted respectively from each processing unit to the transmitter system is implemented at transitions between respectively successive data frames of the output datastreams to be transmitted synchronously.

2. The head station according to claim 1, wherein several decision circuits are configured redundantly.

3. The head station according to claim 2, wherein the redundantly configured decision circuits are arranged outside the at least two identical processing units, and
    wherein each decision circuit is responsible for selecting the output datastream to be transmitted from each processing unit to the transmitter system.

4. The head station according to claim 2, wherein the redundantly configured decision circuits are integrated in a single processing unit, and
    wherein the redundantly configured decision circuits are responsible for selecting the output datastream to be transmitted from each processing unit to the transmitter system.

5. The head station according to claim 2, wherein redundantly configured decision circuits are integrated respectively in every processing unit, and
    wherein the redundantly configured decision circuits within each processing unit are responsible for selecting the output datastream to be transmitted from each processing unit to the transmitter system.

6. The head station according to claim 1, wherein the selection of the output datastream to be transmitted to the transmitter system by each processing unit is implemented on the basis of availability of the respective output datastreams to be selected in each processing unit or on the basis of conformity of the respective output datastreams to be selected with requirements of each transmission standard used or on the basis of status data marking functionality of each processing unit and a respective transmission path from each processing unit to the transmitter system.

7. The head station according to claim 1, further comprising an input bus system for supply of identical input datastreams generated in each case by a data source to individual processing units.

8. The head station according to claim 7, wherein a synchronisation of the identical input datastreams is implemented by an exchange of synchronisation data via the input bus system.

9. The head station according to claim 8, wherein the synchronisation data are time-stamp data transmitted respectively in data packets of the individual identical input datastreams or data for characterising a sequence of data packets in individual input datastreams or a specified databit sequence transmitted in each case at a specified position in specified data packets within the individual identical input datastreams.

10. The head station according to claim 7, wherein the input bus system or the output bus system are configured redundantly.

11. The head station according to claim 1, wherein at least one conversion unit is provided for data conversion of the selected output datastreams to be transmitted to the transmitter system into a data format of a transmission standard used.

12. The head station according to claim 11, wherein the conversion units are configured redundantly.

13. A method for selecting an output datastream to be transmitted respectively in identical processing units of a head station, in each case to a transmitter system, comprising:
    generating an output datastream in every processing unit from at least one of an input datastream supplied to each processing unit;
    exchanging the output datastreams and status data generated in each of the identical processing units via an output bus system connected to the identical processing units;
    selecting the output datastream to be transmitted in each processing unit to the transmitter system by at least one decision circuit connected to an output bus system; and
    transmitting the output datastream selected respectively for each processing unit to the transmitter system,
    wherein synchronous transmission of individual output datastreams to the transmitter system is delayed by a transmission time of an output data frame of the individual output datastreams,
    wherein output datastreams selected respectively for individual processing units are each transmitted synchronously to the transmitter system, and
    wherein the synchronous transmission of the individual output datastreams to the transmitter system is implemented at transitions between respectively successive data frames of the output datastreams to be transmitted synchronously.

14. The method according to claim 13, wherein the selection of the output datastream to be transmitted from each processing unit to the transmitter system is implemented on the basis of availability of the output datastreams to be selected in each processing unit or on the basis of conformity of the output datastreams to be selected in each case with requirements of each transmission standard used or on the basis of status data marking functionality of each processing unit and a respective transmission path from each processing unit to the transmitter system.

15. The method according to claim 13, wherein individual processing units are supplied via an input bus system with identical input datastreams generated in each case by one data source.

16. The method according to claim 15, wherein the input datastreams are synchronised by an exchange of synchronisation data via the input bus system.

17. The method according to claim 13, wherein he selected output datastreams to be transmitted to the transmitter system are converted by conversion units into a data format of a transmission standard used.

18. The method according to claim 13, wherein several redundant decision circuits are used.

* * * * *